June 4, 1957 L. A. PEHRSSON ET AL 2,794,508
CONTROLLABLE PITCH PROPELLER
Filed Oct. 25, 1954 2 Sheets-Sheet 1

INVENTORS
LENNART ANDERS PEHRSSON
KARL EINAR SVAHN
BY
Campbell, Brumbaugh, Free & Graves
THEIR ATTORNEYS

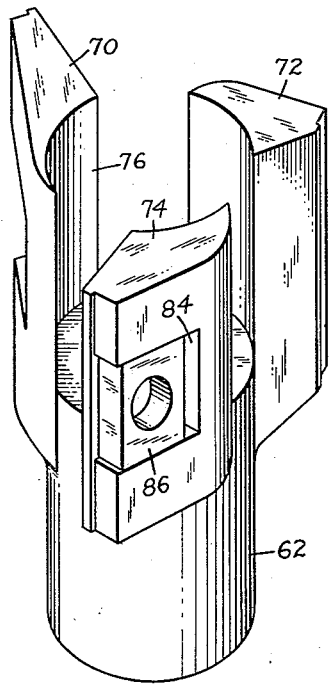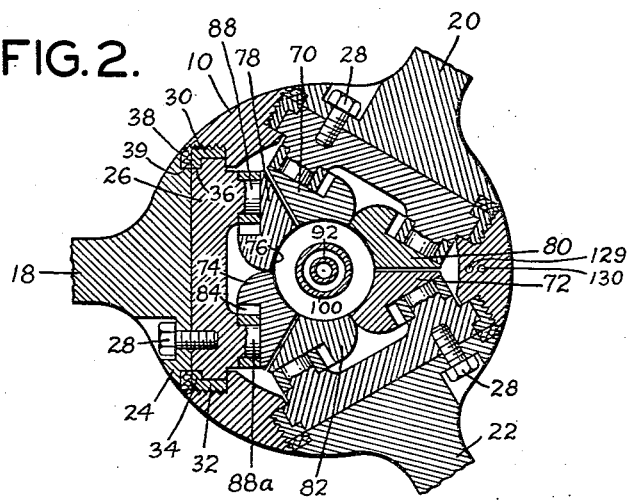

United States Patent Office 2,794,508
Patented June 4, 1957

2,794,508
CONTROLLABLE PITCH PROPELLER

Lennart Anders Pehrsson and Karl Einar Svahn, Karlstad, Sweden, assignors to Aktiebolaget Karlstads Mekaniska Werkstad, Karlstad, Sweden, a corporation of Sweden Application October 25, 1954, Serial No. 464,552

Claims priority, application Sweden October 26, 1953

5 Claims. (Cl. 170—160.32)

This invention relates to controllable pitch propellers and impellers for use in turbines, pumps and in the propulsion of aircraft, ships and the like. More particularly, the invention relates to improvements in hydraulically-actuated pitch control means for such propellers and impellers, hereinafter referred to collectively as "propellers."

It has been proposed, heretofore, to control the pitch of a controllable pitch propeller by means of a hydraulic motor mounted adjacent to the propeller or within its hub. Due to the fact that large torque is required to vary the pitch of the blades while the propeller is in operation, the hydraulic motor either must be of substantial size or it must be actuated by hydraulic pressure of high magnitude. Either alternative has its disadvantages. A large motor is bulky and, if it is mounted within the hub of the propeller, it renders the hub large and unwieldy and also causes the propeller to have substantial drag when it is used for propulsion. Inasmuch as a system for controlling a rotary member such as a propeller includes rotary couplings which are, at best, difficult to seal, the use of high operating pressures in the hydraulic system increases the opportunity for leakage and loss of hydraulic fluid.

The present invention overcomes the disadvantages noted above by providing a controllable pitch propeller that is characterized by a compact, streamlined hub containing a hydraulically operated mechanism that supplies adequate torque for changing the pitch of the blades of the propeller relative to the hub while requiring relatively low hydraulic pressure for its operation.

More particularly, the new propeller contains within its hub a pair of hydraulic motors of the cylinder and piston type. The motors are connected to the blades for rotating them about their axis to vary or control their pitch and the combined areas of the pistons of the motors are great enough to supply the torque needed for changing the pitch of the blades without requiring high pressure for moving the pistons. Moreover, in accordance with the present invention, the hub structure may contain a control valve by means of which a "follow-up" or servo action is obtained so as to enable the accurate control of the pitch of the blades. By providing the two small hydraulic motors of the kind indicated, within the hub of the propeller, the hub may be kept relatively small in transverse dimensions to facilitate its streamlining and reduction of drag thereon. Moreover, the two small motors supply sufficient power to readily control the pitch of even relatively large blades mounted on the hub at relatively low hydraulic pressure.

For a better understanding of the present invention, reference may be had to the accompanying drawings in which:

Fig. 2 is a view in cross-section taken on line 2—2 of Fig. 1 of the drawings; and Fig. 3 is a perspective view of a portion of a piston rod and control elements thereon for varying the pitch of the propeller blades.

Figure 1:
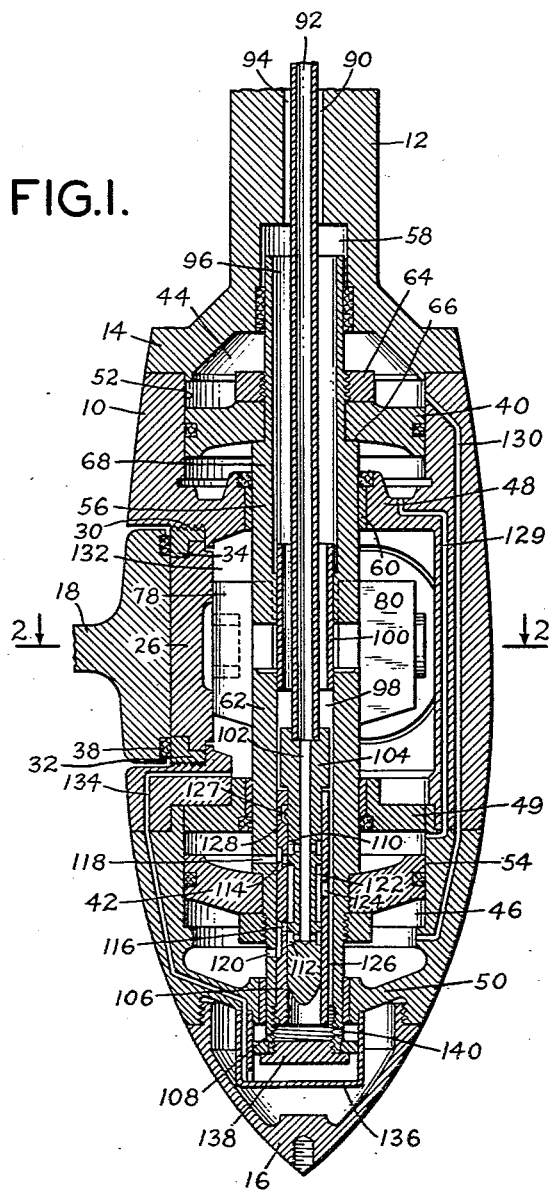
Fig. 1 is a view in longitudinal section through the hub and a portion of one blade of a typical variable or controllable pitch propeller of a type embodying the present invention.

The invention is applicable to propellers and impellers for use in pumps, turbines, propelling ships, aircraft and the like and it will be described with reference to a propeller and hub structure suitable for use in marine propulsion. As illustrated in Fig. 1, a typical propeller includes a hollow casing 10 connected to a tubular propeller shaft 12 which is driven in any suitable way. The hub 10 is secured to a flange 14 on the propeller shaft by means of screws or in any other suitable way. The hub 10 is of streamlined shape having a removable pointed trailing end 16 to reduce turbulence.

Extending laterally or substantially radially from the housing are a plurality of propeller blades 18, 20 and 22 which are equally spaced around the housing. It will be understood that more than the three blades or fewer than three blades may be provided as required.

As shown in Figs. 1 and 2, each blade 18, 20 and 22 is rotatably mounted in the hub for rotation about an axis extending substantially radially to said hub. The blades may be secured to the hub in any suitable way. For example, each blade may have a flared root portion 24 that is secured to a disk-like plate 26. The plate 26 may be secured to the blade 18 by means of a plurality of machine screws 28, and is received in a circular recess 30 in the side of the hub 10 and retained therein by means of a ring 32 having an inwardly extending flange 34 thereon engaging in a groove 36 in the outer surface of the plate 26. It will be understood that the ring 32 is assembled between the root portion 24 of the blade and the plate 26 before they are secured together. The ring 32 is provided with external threads enabling it to be screwed into threads in the wall of the recess 30 to hold the propeller blade in position. A pin or key (not shown) may be used to lock the ring 32 against rotation after it is screwed into place.

In order to prevent leakage of water around the propeller blade into the hub, a suitable packing 38 may be disposed in a groove 39 in the root portion 24 of the blade and in sliding and sealing contact with the ring 32.

The mechanism for rotating the blades 18, 20 and 22 includes a pair of pistons 40 and 42 which are slidable axially in cylinders 44 and 46 adjacent the opposite ends of the casing 10. One head of the cylinder 44 is formed by the flange 14 and its other head comprises a transverse partition 48 in the hub.

The heads of the cylinder 46 are an inner partition 49 adjacent the blades 18, 20 and 22 and an outer partition 50 near the outer end of the hub 10. Both of the cylinders have cylindrical walls 52 and 54 receiving the pistons in sliding relation.

Movement of the piston 40 is transmitted to the propeller blades by means of a tubular piston rod 56 which is slidably guided in a cylindrical recess 58 in the end of the propeller shaft 12 and in a bearing or bushing 60 in the partition 48. The piston rod 56 is substantially in liquid-tight relation to the partition 48 and the propeller shaft 12. A similar tubular piston rod 62 is connected to the piston 42 and is slidably guided in the partitions 49 and 50.

The piston 40 is secured to the piston rod 56 by means of a clamping nut 64 threaded on a reduced neck of the piston rod and holding the piston 40 against a shoulder 66 on an enlarged section 68 of the piston rod. A similar connection is provided to detachably mount the piston 42 on the piston rod 62.

Reciprocating movement of the pistons 40 and 42 is transmitted to the blades 18, 20 and 22 and converted to rotary movement of the blades in any suitable way, for example, by means of sliding and pivot connections. As illustrated in Figs. 2 and 3, each piston rod, for example, the piston rod 62 shown in Fig. 3, has a series of lugs 70, 72 and 74 formed on its periphery and extending lengthwise thereof and defining a cylindrical cavity 76 therebetween approximately the same diameter as the piston rod. Each of the lugs 70, 72 and 74 spans a sector of about 60°, so that corresponding lugs 78, 80 and 82 on the piston rod 56 fit between the lugs 70, 72 and 74 and slidably engage the piston rod 62. Each of the lugs 70, 72, 74—78, 80 and 82, is provided with a transversely extending recess 84 in its side in which is mounted a bearing block 86. The bearing block is slidable transversely of the lug and receives a corresponding pin 88 or 88a adjacent one edge of the disk 26 connected to the corresponding propeller blade. Each disk has two pins 88, 88a diametrically spaced for engagement with lugs on each of the piston rods 56 and 62, whereby movement of the pistons in opposite directions will cause simultaneous rotary movement of the propeller blades about their axes and corresponding variation in their pitch.

Operation of the motors comprising the piston and cylinder is accomplished hydraulically in the following manner. The tubular propeller shaft 12 has an axial bore 90 in which is received an axially movable pipe or conduit 92 connected with a source of liquid under pressure such as, for example, a hydraulic pump. A space 94 is provided between the pipe 92 and the wall of the bore 90 through which liquid is returned to the intake of the pump. The passage 94 communicates with the enlarged recess 58, a passage 96 in the hollow piston rod 56 and a passage 98 in the hollow piston rod 62. Liquid flows from the passage 98 to the passage 96 through a sleeve 100 fixed in the inner end of the piston rod 62 and slidably and telescopically received in the inner end of the piston rod 56. Liquid under pressure is supplied through the pipe 92 to an axial passage 102 in a cylindrical slide valve plug 104, which is in liquid-tight and sliding engagement with the valve sleeve 106 fixed within the outer end of the piston rod 62. The sleeve 106 may be secured in position by means of the screw threads 108 at the outer ends of the piston rod and the sleeve.

A pair of ports 110 and 112 are disposed in spaced relation in the plug member 104 for selective communication with the ports 114 and 116 in the valve sleeve 106. The ports 114 and 116 are in communication with radial passages 118 and 120 in the piston rod 62 on opposite sides of the piston 42.

A groove 122 is formed on the exterior of the valve plug member 104 between the ports 110 and 112 and this groove is at all times in communication with an opening 124 in the sleeve 106 and a groove or space 126 extending lengthwise thereof into communication with the passage 98 in the piston rod 62. Movement of the plug 104 relative to the sleeve 106 may be limited by means of a lug 127 fitting loosely in a groove 128 in the sleeve 106.

Also, as shown in Fig. 1, the space in the cylinder 44 between the piston 40 and the partition 48 is connected to the space between the piston 42 and the partition 49 by means of a passage 129 so that the pressures of these two portions of the cylinders are always essentially the same. Similarly, the spaces on the opposite sides of the pistons are connected by means of a passage 130. It will be understood that the passages 129 and 130 may be formed in the hub as in the manner illustrated, or by suitable pipe connections and passages.

With the structure thus far described, when the valve plug member 104 is displaced outwardly by movement of the pipe 92, the port 110 will be brought into complete or partial alignment with the port 114 in the sleeve while the port 112 will move farther out of alignment with the port 116. Accordingly, fluid under pressure will flow along the pipe 92 through the ports 110 and 114 and the passage 118 into the cylinder 46 between the piston 42 and the partition 49 and also through the passage 129 into the cylinder 44 between the piston 40 and the partition 48 thereby urging the pistons apart. Fluid in the cylinder 44 on the opposite side of the piston 40 will flow from the cylinder 44 through the passage 130 into the cylinder 46 and the liquid in the cylinder 46 will flow into the passage 120, the groove 122 which has been moved into alignment with the port 116, out through the opening 124 and the groove 126, into the passages 98, the hollow sleeve 100, the passage 96 and the passage 94 to a low pressure side of the hydraulic system or pump. The unequal pressures on opposite sides of the pistons 40 and 42, therefore, will cause them to move apart until the port 114 in the sleeve which moves with the piston 42, moves out of alignment with the port 110, thereby shutting off the supply of liquid to the cylinder. At the same time, the port 116 will move out of alignment with the groove 122 so that the pistons are locked by the liquid trapped in the cylinders. The spacing of the ports 110 and 112 should be such that they are essentially in edge engagement with and disposed on opposite sides of the ports 114 and 116 and the groove 122 is of such length that its opposite edges are substantially in edge to edge relation to the ports 114 and 116 when the valve plug is in its neutral relation to the sleeve.

Inasmuch as some leakage from the cylinders would normally occur into the chamber 132 in the hub between the partitions 46 and 48, means is provided for maintaining liquid under pressure in this portion of the hub at all times to reduce such leakage and also prevent leakage of water or other liquid into the hub, when the propeller is used in such liquid. Thus, the chamber 132 is connected by means of a passage 134 to an auxiliary cylinder 136 carried by the partition 50 and enclosing the lower end of the piston rod 62. The piston rod 62 is provided with an enlarged piston head 138 having a cross-section or surface area equal to the sum of the cross-sectional areas of the portions of the piston rods 56 and 62 projecting into the chamber 132. In this way, movement of both of the piston rods 56 and 62 toward each other and into the chamber 132 will displace liquid from or reduce the capacity of the chamber 132. The displaced liquid can flow through the passage 134 because movement of the piston 138 with the piston rod 62 will increase the capacity of the cylinder 136 substantially in proportion or complementally to the decrease in the capacity of the chamber 132. Likewise, when the pistons 40 and 42 move apart, the piston 138 will displace liquid from the cylinder 136 in an amount complemental to the increased capacity of the chamber 132 occasioned by partial retraction of the ends of the piston rods 56 and 62 therefrom. Liquid pressure above the piston 138 may be maintained at pump intake pressure by means of a small leak port 140 through a side wall of the lower end of the piston rod 62 to avoid hydraulic locking of the piston 138.

The above-described pitch control mechanism has the advantage of providing a compact hub assembly containing a servo or follow-up mechanism by means of which the pitch of the propellers can be controlled accurately. By using two opposed piston and cylinder assemblies, a relatively large piston area can be provided while maintaining the cross-sectional diameter of the hub relatively small, thereby enabling the development of relatively high torques at the propeller blades with relatively low hydraulic pressures. By utilizing sliding and pivot connections, effective at diametrically spaced points adjacent the periphery of the root of the blade, a more effective transfer of power is possible, without undesirable deflection and binding of the blade. It will be understood, of course, that other types of connections than the sliding pivot connection between the blade and the pistons may be provided, if desired. For example, pivoted link connections may be used, although the sliding pivot connection is preferred because of the relative freedom from play or lash possible with such a sliding pivot connection. Other modifications can be made, such as in the mounts for the blades and in the type of control valve used.

Inasmuch as the form of the invention described above is susceptible to considerable modification, it should be considered as illustrative of the invention and not as limiting the scope of the following claims.

We claim:

1. A propeller having a plurality of controllable pitch blades thereon, comprising a hollow hub supporting said blades for rotation about axes substantially radial to said hub, substantially axially aligned cylinders in said hub on opposite sides of the axes of rotation of said blades, pistons reciprocable in said cylinders, means connecting both of said pistons to each blade at places on opposite sides of its axis of rotation to rotate the latter about their axes upon movement of said pistons in said cylinders, and means to supply liquid to said cylinders to move said pistons simultaneously in opposite directions therein and rotate said blades.

2. A propeller having a plurality of controllable pitch blades, comprising a hollow hub having a longitudinal axis, said hub supporting said blades for rotation about axes substantially radial to the axis of said hub and lying substantially in a plane perpendicular to the longitudinal axis of said hub, said hub having coaxial cylinders therein on opposite sides of said plane, pistons mounted in said cylinders for movement axially thereof, piston rods fixed to said pistons, sliding pivot connections between each piston rod and each blade to rotate the blades simultaneously in the same direction upon movement of said pistons in said cylinders said sliding pivot connections being spaced substantially on opposite sides of the axis of rotation of each blade, and means to introduce liquid into said cylinders to one side of each piston to exert substantially equal pressures on said pistons and move them simultaneously in opposite directions with substantially equal force.

3. A propeller comprising a hollow hub having a cylinder adjacent each end thereof and a chamber to receive liquid between them, a plurality of blades rotatably mounted in said hub and extending outwardly from the hub around said chamber, pistons movable axially of said cylinders, piston rods fixed to said pistons and movable in and varying the capacity of said chamber, means connecting each piston rod to each blade to rotate said blades upon movement of said pistons, means to supply liquid to said cylinders to move the pistons therein simultaneously, and means in said hub communicating with said chamber for receiving liquid from said chamber and returning liquid to said chamber to compensate for variation in the capacity of said chamber by movement of said piston rods in said chamber.

4. The propeller set forth in claim 3, in which the means to compensate for the variation in the capacity of said chamber comprises another cylinder in said hub communicating with said chamber and another piston in said another cylinder connected to one of said piston rods and movable in said another cylinder to vary the capacity of said another cylinder complementally to the variation in the capacity of said chamber.

5. The propeller set forth in claim 4, in which the cross-sections of said another piston and cylinder are substantially equal to the combined cross-sections of the portions of the piston rods in said chamber.

References Cited in the file of this patent

UNITED STATES PATENTS

| | | |
|---|---|---|
| 1,396,325 | Gloor | Nov. 8, 1921 |
| 2,255,920 | Englesson | Sept. 16, 1941 |
| 2,433,990 | Hardy | Jan. 6, 1948 |
| 2,513,546 | Atteslander | July 4, 1950 |
| 2,686,569 | Bruce | Aug. 17, 1954 |
| 2,693,243 | Strandell et al. | Nov. 2, 1954 |

FOREIGN PATENTS

| | | |
|---|---|---|
| 675,767 | Great Britain | July 16, 1952 |
| 889,402 | Germany | Sept. 10, 1953 |